United States Patent [19]

Baumann et al.

[11] 4,369,264

[45] Jan. 18, 1983

[54] AQUEOUS TREATING COMPOSITION FOR GLASS FIBER STRANDS USED TO PRODUCE MATS FOR THERMOPLASTIC POLYMERS

[75] Inventors: John A. Baumann, Lower Burrell, Pa.; Raymond H. Cates, Shelby, N.C.; Charles E. Picone, Lower Burrell, of Pa.

[73] Assignee: PPG Industries, Inc., Pittsburgh, Pa.

[21] Appl. No.: 221,490

[22] Filed: Dec. 30, 1980

[51] Int. Cl.³ ............................................. C03C 25/02
[52] U.S. Cl. .................... 523/209; 523/217; 106/288 R; 428/378; 428/391; 65/3.41
[58] Field of Search ............... 260/29.6 BM, 29.6 M; 524/494; 106/288; 65/3.41; 523/217, 209; 428/378, 391

[56] References Cited

U.S. PATENT DOCUMENTS

| | | | |
|---|---|---|---|
| 2,938,812 | 5/1960 | Marzocchi et al. | 260/29.6 BM |
| 3,849,148 | 11/1974 | Temple | 106/287 SB |
| 3,852,051 | 12/1974 | Fahey | 260/29.6 M |
| 3,882,068 | 5/1975 | Swartz | 260/29.6 |
| 4,016,129 | 4/1977 | Miyosawa | 260/29.6 BM |
| 4,188,421 | 2/1980 | Matsuura et al. | 427/385 A |
| 4,248,935 | 8/1980 | Temple | 428/391 |

*Primary Examiner*—Joseph L. Schofer
*Assistant Examiner*—N. Sarofim
*Attorney, Agent, or Firm*—Kenneth J. Stachel

[57] ABSTRACT

Glass fibers are treated with an aqueous treating composition having a lubricant and either a mixture of heat stable organic peroxide, vinyl-containing coupling agent and nonionic surfactant and optionally a film former such as polyvinylacetate or carboxylated compatible polymer film former like carboxylated polypropylene and an amino coupling agent. Other materials such as softeners, pigments and the like may be added to the aqueous treating composition. The treated glass fiber strands are used in the form of continuous glass strands or chopped strands or a mixture thereof to prepare glass fiber strand mat for use in reinforcing thermoplastic polymers. Thermoplastic polymers reinforced with mats made of the treated glass fiber strands of the present invention have improved stamping properties.

26 Claims, No Drawings

AQUEOUS TREATING COMPOSITION FOR GLASS FIBER STRANDS USED TO PRODUCE MATS FOR THERMOPLASTIC POLYMERS

The present invention is directed to an aqueous treating composition for treating glass fiber strands used to produce mats of glass fiber strands for reinforcing polymeric materials. This invention is also directed to the treated strands, mats and mat reinforced polymeric material.

More particularly the present invention is directed to the use of treated glass fiber strands to produce a mat, and the mat itself, having good stamping performance when used in a composite with a thermoplastic polymeric material.

Glass fibers that are produced by rapid attenuation of many filaments of molten glass issuing from orifices in a bushing of a glass batch melting furnace are gathered during this forming process to produce strands. These glass fiber strands in continuous or chopped form have been used to reinforce thermoplastic polymeric materials. In addition, the strands in either continuous or chopped form can be used to produce mats of glass fiber strands, where the mats are used to reinforce thermoplastic polymeric materials.

In using chopped glass fiber strands, continuous glass fiber strands or mats of either to reinforce thermoplastic polymeric materials the absence of effective coupling between the surface of the glass and the polymer matrix leads to a low level of adhesion between the two, which may result in separation under stress. The art has provided effective coupling between the surface of the glass and the polymeric matrix by the use of specific chemical additives in the sizing composition on the glass fibers. The sizing composition is applied to the glass fibers during the process of forming the glass fibers and producing the glass fiber strands. The sizing composition is typically applied to the glass fibers as they are being attenuated from the small orifices in the bushing and before they are gathered into strands and collected as either chopped glass fiber strands or continuous glass fiber strands. The sizing composition provides protection for the glass fibers from interfilament abrasion and makes the glass compatible with the polymeric matrix. Typically sizing compositions are aqueous compositions having film formers, coupling agents and lubricants.

Where the glass fiber strands having the dried residue of an aqueous treating composition are to be used either as chopped strands or continuous strands in the formation of a mat to be used as reinforcement for polymeric materials, it is important that the mat be so constructed that the polymeric material can adequately penetrate the mat. In addition, the mat must be constructed to enable adequate curing of the polymeric material or between chemicals in the size residue and the polymeric material. Also the glass mat must have a degree of flowability to allow the glass mat and thermoplastic polymeric laminate to fill a mold in a stamping press in a near homogenous manner to reduce void spaces in the stamped article. Mats formed from glass fiber strands having the dried residue of an aqueous treating composition known in the art do not have the best construction to meet these requirements.

An example of an aqueous treating composition used to treat glass fibers used to produce chopped glass fiber strands for use in reinforcing thermoplastic resins systems was disclosed in U.S. Pat. No. 3,882,068 (Swartz). The aqueous sizing composition had 2 to 30 percent by weight of a polyolefin emulsion, a coupling agent in an amount of 0.01 to 2.5 percent by weight and a balance of water. An example of an aqueous sizing composition used to treat glass fiber strands used to reinforce polyolefins was disclosed in U.S. Pat. No. 3,849,148 (Temple). In this patent it was disclosed that the sizing composition had a coupling agent, a heat stable organic peroxide, a nonionic surfactant and a lubricant. Optionally the sizing composition could also have a film forming material. In U.S. patent application Ser. No. 935,275 (Temple) assigned to the assignee of the present application there is disclosed a sizing composition used on glass fiber strands to reinforce polyolefins having a coupling agent, stabilizer, lubricant such as an emulsion of a maleonated amorphous polypropylene, noncrosslinkable film former, softener and surfactant.

In these latter two disclosures the glass fiber strand having the dried residue of the aqueous sizing composition could be used in the form of continuous strand mat that was needled to reinforce the polymeric matrices. Such an operation involved having a plurality of needles with barbes such as a typical loom needles repetitively enter and leave the mat as the mat passes the plurality of needles. This needling operation causes a degree of breakage of the glass fiber strands and the fibers within strands. This type of mat must also have a proper construction to allow for impregnation of the polymeric material throughout the mat and to allow for proper curing and/or heating of the polymeric materials in contact with the mat when the mat and polymeric matrix are combined.

It is an object of the present invention to provide an aqueous treating composition for glass fibers to enable the treated glass fiber strands to form a mat having improved construction for thermoplastic polymer reinforcement.

SUMMARY OF THE INVENTION

The aforementioned objects and other objects derivable from the following disclosure are accomplished by the present invention which involves the use of an effective amount of an aqueous dispersible solid particulate inorganic compound in the aqueous glass fiber treating composition.

The aqueous treating composition of the present invention for treating glass fibers has suitable adhesion promoting agents for providing adequate adhesion between the glass fibers and polymeric matrix, lubricant, and an effective amount of the aqueous dispersible, particulate, inorganic compound.

The suitable adhesion promoting agents can be a heat stable, free-radical initiator and a vinyl-containing organic coupling agent or a carboxylated polymeric film former compatible with the polymeric matrix to be reinforced and an amino-containing coupling agent. The former provides adhesion through free radically generated crosslinking of the matrix polymer and vinyl-containing coupling agent and/or entanglements of the matrix polymer chains and chemical molecular chains emanating from the reacted vinyl-containing coupling agent. The later adhesion promoting agents operate by the chemical reaction between the carboxyl groups in the film former polymer and the matrix polymer and amine groups of the coupling agent and through entanglements of matrix polymer chains and reacted film former and coupling agent molecular chains. In addition, the aqueous treating composition can have one or more film formers, one or more softening agents, one or more stabilizers, one or more thickening agents, additional coupling agents and one or more surfactants for dispersing the solid inorganic compound and/or the peroxide. If a surfactant is used to disperse the solid inorganic compound it is better to combine the inorganic compound and the surfactant in an aqueous solution and add this mixture to the other components to prepare the aqueous treating composition.

The effective amount of the aqueous dispersible solid particulate inorganic compound is that amount that lowers the loft and tensile strength of a mat prepared from the treated glass fiber strands. Amounts of the other components in the aqueous treating composition are those that are conventionally used in aqueous treating compositions for treating glass fibers.

The method of using the aqueous treating composition to treat the glass fibers can be any of the conventional methods known to those skilled in the art for performing this operation. The treated glass fiber strand can be used in the form of chopped glass fiber strands or of continuous glass fiber strands to prepare a mat by any method known in the art. The mat having a decreased loft and tensile strength over a mat formed from glass fibers treated with an aqueous treating composition lacking the solid inorganic compound as used in the present invention has improved stamping performance when made into a composite with a thermoplastic polymeric matrix. A nonexclusive example of this improved performance is where the thermoplastic polymer like polyolefin is prepared into a composite with a needled mat of continuous glass fiber strands having the dried residue of the aqueous treating composition of the present invention. Such a composite has improved stamping properties in forming molded articles when the composite is heated to the softening point of the thermoplastic polymer and stamped in a mold. The glass mat has improved flowability to produce a more homogeneously reinforced stamped material.

DETAILED DESCRIPTION OF THE INVENTION

When mats of glass fiber strands are used to reinforce thermoplastic materials such as polyolefins, polyamides such as nylon, polyalkylene terephthalates such as polybutyleneterephthalate and the like, the polymeric materials are combined with the mat reinforcement at an elevated temperature and pressure to make a composite. For the best composite it is desired that the polymeric material impregnate the mat to a very high degree. This enables intimate contact between the glass fibers and strands within the mat and the thermoplastic polymeric material. Such a composite is then heated and stamped into molded articles. During the stamping operation the polymer in the composite and the glass fiber reinforcement must flow to conform to the dimensions, shape and any designs of the mold in the stamping press, when stamped with the die to produce the finished stamped article. For more efficient stamping and the production of a better stamped article, the loft and/or tensile strength of the glass fiber mat within the composite can not be too high or it may result in nonhomogeneous flow of the thermoplastic polymer and/or the glass mat in the mold. Another result of two high of a loft for the mat could be nonhomogeneous heating of the thermoplastic material which may result in degradation of some of the surface polymeric thermoplastic material and inadequate heating and poor flow of some of the thermoplastic polymeric material in the center of the composite. If the loft of the glass fiber strand mat is too low, the composite of mat and thermoplastic polymer may have poor physical properties due to the lack of the highest degree of impregnation of the thermoplastic polymer into the mat. Other advantages of a lofty glass fiber strand mat for a needed mat of continuous glass fiber strands are detailed in U.S. Pat. No. 3,621,092 (Hofer) hereby incorporated by reference.

The aqueous dispersible, solid particulate inorganic compound in the broad aspect of the present invention can be any inorganic compound that has a moh hardness at least the same as the moh hardness for glass and even some inorganic compounds that might have a moh hardness less than glass that are used as white pigments and pigment extenders. Nonexclusive examples of these inorganic compounds include basic carbonate white lead, basic sulfate white lead, basic silicate white lead, leaded zinc oxide, zinc oxide, zinc sulfide, lithopone, titanium dioxide of any crystal structure, composites of titanium dioxide and calcium sulfate, and antimony oxide, magnesium silicate, barytes, basic lead carbonate, titanated lithopone, surface treated titanium dioxide pigments, titanium dioxide barium sulfate composites, calcium carbonate, calcium sulfate, barium sulfate, silica, calcium silicate, silica flatting agents, aluminum silicate including hydrous aluminum silicates, magnesium silicates, calcium metasilicate, sodium-potassium-aluminum silicate, and mica (orthosilicate of aluminum and potassium).

If any of the aforementioned materials are water dispersible by themselves they can be added directly or in an aqueous solution to the aqueous treating composition of the present invention. If any of the materials are not hydrophilic enough to be water dispersible they can be combined with surfactants such as anionic, cationic, nonionic and amphoteric.

The inorganic compound, when added to the aqueous treating composition with other components present, should not result in a treating composition with too low a pH that would interfere with any silane coupling agents present in the aqueous treating composition. Also the inorganic compound added to the composition should not result in a composition having too high a pH so as to be detrimental to the glass. Generally, the inorganic compound no matter how it is added to the aqueous treating composition should not be of such a pH as to result in an aqueous treating composition having a pH below 2 or above 11. Generally, the particle size of the water dispersible, solid particulate inorganic compound should not be too course so as to plug any processing equipment used in applying the aqueous treating composition to the glass fibers. Generally, the average particle size of the solid inorganic compound is less than 5 microns and preferably less than 2 microns.

A particularly suitable solid inorganic compound useful in the present invention is titanium dioxide in combination with a surfactant such as glycol and water. A particularly useful commercial source of titanium dioxide for use in the present invention is available from Borden Chemical Company under the trade designation of Aquawhite 548-21 Water Dispersion of Titanium Dioxide. An effective amount of the titanium is added to the aqueous treating composition. An effective amount is an amount equivalent to an amount of titanium in a water dispersion of around 35±2% solids added in an amount in the range of about 0.001 to about 1.5 weight percent of the aqueous treating composition.

If lower amounts are used the benefit to the mat formed from the treated glass fiber strand will not be as dramatic. If the amount of titanium dioxide is higher than about 1.5 weight percent for such an aqueous treating composition, the physical properties of the mat formed from the treated glass fiber strands will be detrimentally affected.

The aqueous treating composition for treating the glass fibers in addition to the water dispersible, solid, particulate inorganic compound also has other known glass fiber sizing ingredients. The aqueous treating composition would at a minimum have a lubricant and either of the adhesion promoting agent systems. One adhesion promoting system being the heat stable organic peroxide and nonionic surfactant and vinyl-containing coupling agent. The other system is the polymeric film former with carboxylation and an amino coupling agent. The peroxide containing aqueous sizing composition may be like that disclosed in U.S. Pat. No. 3,849,148 (Temple), hereby incorporated by reference, or aqueous treating compositions having peroxides that are placed into aqueous solutions without melting the heat stable peroxide. An example of an aqueous treating composition having a compatible polymeric film former with carboxylation and amino coupling agent is disclosed in allowed U.S. patent application Ser. No. 935,275 filed June 26, 1980 which is herein incorporated by reference.

In addition the aqueous treating composition may have one or more pigmenting agents to make the glass fibers compatible in color with the color of the polymeric matrix. A nonexclusive example of such a pigmenting agent is carbon black that can be added to the aqueous treating composition in a water dispersion with suitable surfactants in an effective amount to allow the glass fibers in the mat to blend with the pigmented color of any matrix polymer.

In addition to the aforementioned components in the aqueous treating composition there may be and preferably is present a film-forming polymer. Nonexclusive examples of film-forming polymers include polyvinylalcohol, polyvinylacetate, polyvinylpyrrolidone, polyvinylacetate copolymers such as vinylacetate-metholacryl-amide copolymer. The amount of the film forming polymer used is generally in the range of about 1 to about 15 weight percent of the aqueous treating composition. Also a softening agent may be added that softens the strand, modifies drape, decreases scroopiness of the fibers and contributes lubricity such that the fibers and strands may be successfully needled in the mat without excessive fiber breakage. Also, in addition to the types of surfactants used in U.S. Pat. No. 3,849,148, the surfactant can be those that act as wetting agents, emulsifiers and detergents to maintain the aqueous treating composition as an emulsion and prevent buildup of the solids on the applicator apparatus when the aqueous treating composition is applied to the glass fibers. Among suitable surfactants are condensates formed by condensing propyleneoxide and propylene glycol such as those disclosed in U.S. Pat. No. 2,674,619. Particularly suitable surfactants are those condensates having a molecular weight of about 1500 to 2000 and between 70 and 80 percent by weight of the poly(oxyethylene) in the molecule to successfully control foaming and aid in stabilizing the sizing emulsion. The surfactant is utilized in any amount that effectively maintains the emulsion and prevents buildup of solids on the applicator apparatus.

The aqueous treating composition for glass fibers is prepared by any method known to those skilled in the art such as U.S. Pat. No. 3,849,148 whereto the aqueous dispersible, solid particulate inorganic compound can be added alone to the other components to make up the aqueous treating composition or can be added in an aqueous dispersion with surfactants. The aqueous treating composition is used to treat glass fibers in any method known by those skilled in the art. The treated glass fibers can be in the form of continuous strands of glass fibers, continuous glass fibers or some fibers may be in the form of chopped fiber strands. These treated materials are used to produce mat by any method known to those skilled in the art. The continuous bundles of glass fibers can be as glass fibers directly from a bushing in a glass melting furnace and gathered into the bundles of fibers. Also the continuous bundles of glass fibers can be produced into packages of continuous glass fiber strands before being made into a mat. The packages of the continuous strand can be wet or dry, preferably dry, in producing the mat. A nonexclusive example of treating glass fibers with the aqueous treating composition is a process illustrated in FIG. 2 of U.S. Pat. No. 3,849,148 which is hereby incorporated by reference. Glass fiber filaments emerge from orifices of an electrically heated bushing. These fibers are attenuated by means of a strand pulling device and gathered to form a strand of glass fibers which may comprise numerous individual fibers. The sizing is applied to the fibers by a conventional size applicator such as a kiss applicator or a belt applicator device. Details of a sizing applicator are shown in U.S. Pat. No. 2,728,972. Filaments after exiting the bushing are cooled by air or preferably by water. The filaments are gathered into bundles by gathering shoe and are then led to the strand pulling device such as illustrated in U.S. Pat. No. 3,292,013 as well as in the above referenced U.S. Pat. No. 3,849,148. If packages of glass fiber strands are to be used in producing the mat, the glass fiber strand or strands, if the filaments exiting from the bushing have been gathered into several strands, are wound onto a forming tube on a collet rotating at approximately 1200 rpm to produce a strand travel of approximately 3200 to 4000 feet per minute. The glass fiber strand forming packages are then dried to a moisture content of around 2 to 10 percent, preferably 4 to 5 percent. Generally a curing temperature for the instant size is from around ambient to 140°–150° F.

Glass fiber strand mat is provided from continuous glass fiber strands in the form of unstranded glass filaments, stranded glass filaments and bundles of stranded glass filaments hereinafter all are referred to as bundles of glass fibers. Particularly useful mat of glass fiber strands for use in reinforcing thermoplastic polymers is a needled continuous glass fiber strand mat. The continuous strand mat is formed from a plurality of the bundles of glass fibers that are provided from a source which may be the bushing, a suitable wound package or some other convenient source thereof. The plurality of bundles of strands are formed into the mat by being taken from their source by means of a filament dispersing and mat forming machine such as a Garnett-type machine coupled with suitable fiber, strand or mat dispersing apparatus. A homogeneous mat of bundles of glass fibers is formed from such a source by operation of such machinery so that the filaments are free to move relative to each other. Various additional processing steps may be performed on the glass fibers before being formed into a mat. If desired, for example, the filaments may be crimped by any suitable apparatus known to those skilled in the art. Moreover the filamentary material may be produced by flame attenuating primary filaments into fine diameter, staple fiber forms. Also some of the filaments may be chopped to any desired staple length by use of a conventional chopping machine well known to those skilled in the art. In general, any desired processing that is not detrimental to ultimately producing a uniform mat of bundles of glass fibers that are free to move relative to each other may be employed. It makes no difference if such processing is performed prior to, during, or subsequent to initial formation of the mat. After initial formation of the mat of uniformly dispersed bundles of glass fibers, it has been found desirable to provide the mat with sufficient integrity to maintain the achieved uniformity in fiber distribution during subsequent processing or handling. For this reason the particularly suitable continuous strand mat, i.e. needled mat, is needled by a conventional needle loom using barbed needles. Thereafter, the mat is gathered by winding into a roll for subsequent use or cut to desired lengths or passed on for further processing.

A plurality of forming packages can be used in forming a thermoplastic composite article reinforced with needled glass fiber mat by arranging the plurality of forming packages so that the strands may be drawn from the packages and laid down to form a mat of continuous fibers, such as disclosed in U.S. Pat. No. 3,883,333 or U.S. Pat. No. 3,664,909. The continuous strand mat may be needled and combined or impregnated with the thermoplastic polymer to form a laminate with the thermoplastic polymer to form reinforced thermoplastic articles. The thermoplastic polymer can be polyolefins, polyamides, polyalkylene terephthalate and the like. The reinforced thermoplastic articles are then heated to the softening temperature of the matrix polymer and under pressure for a period of time of around 5 to about 20 minutes to bind the sized glass fiber strand mat to the thermoplastic resin. The laminated thermoplastic glass fiber mat articles may then be stamped or molded by a variety of means, including that of U.S. Pat. No. 3,884,909 hereby incorporated by reference to produce reinforced thermoplastic laminates suitable for use as containers or for other low cost, high strength uses.

Other types of thermoplastic polymers that can be used in the composite with the glass mat include: chemically coupled polypropylene, polypropylenes with small amounts of polyethylenes and homopolymeric and copolymeric substances such as (1) vinyl resins formed by the polymerization of vinyl halides or by the copolymerization of vinyl halides with unsaturated polymerizable compounds, e.g., vinyl esters, alpha, beta-unsaturated acids, alpha, beta-unsaturated esters, alpha, beta-unsaturated ketones, alpha, beta-unsaturated aldehydes and unsaturated hydrocarbons such as butadienes and styrenes; (2) poly-alpha-olefins such as polyethylene, polypropylene, polybutylene, polyisoprene and the like, including copolymers of poly-alpha-olefins; (3) phenoxy resins; (4) polyamides such as polyhexamethylene adipamide, poly-alpha-caprolactam and the like, including copolymers of polyamides; (5) polysulfones; (6) polycarbonates; (7) polyacetals; (8) polyethylene oxide; (9) polystyrene, including copolymers of styrene with monomeric compounds such as acrylonitrile and butadiene; (10) acrylic resins as exemplified by the polymers of methyl acrylate, acrylamide, methylol acrylamide, acrylonitrile and copolymers of these with styrene, vinyl pyridines, etc.; (11) neoprene; (12) polyphenylene oxide resins; and (13) cellulose esters including the nitrate, acetate, propionate, etc. This list is not meant to be limiting or exhaustive but merely to illustrate the wide range of polymeric materials which may be employed in the present invention.

PREFERRED EMBODIMENT

The aqueous treating composition preferred for use in the present invention is the aqueous treating composition disclosed in U.S. Pat. No. 3,849,148 wherein a polyvinylacetate film former is used in addition to the heat stable organic peroxide, nonionic surfactant, vinyl-containing coupling agent, and lubricant. To this aqueous treating composition it is preferred to add titanium dioxide as the water dispersible, solid, particulate inorganic compound. The most suitable titanium dioxide material for addition to the aqueous treating composition is the water dispersion available from Borden Chemical Company under the trade designation "Aquawhite" dispersion. The preferred amounts of the aqueous dispersion which usually is diluted to around 35 weight percent solids dispersion to be added to the aqueous treating composition is in the range of about 0.05 to about 0.4 weight percent of the aqueous treating composition. Generally, the aqueous treating composition has a total solids in the range of about 1 to about 20 weight percent of the aqueous treating composition and preferably about 2 to about 10 weight percent.

The aqueous sizing composition generally contains about 99% to about 80% water. It is preferred to use a kiss roll applicator and to have between 83 and 98 parts by weight water in the aqueous sizing solution. Thus, solids amount is greatly dependent upon the applicator that is used to size the glass fiber strands. The amount of the sizing used on the glass may be any amount which results in good structural strength of the finished thermoplastic reinforced laminate, good fiber integrity and handleability. A suitable amount of the sizing is about 0.02 to about 1 percent by weight sizing solids to total weight of the sized strand of glass. A preferred range is about 0.6 percent to give good fiber integrity and handleability.

A plurality of the forming packages are then mounted on a creel threaded through a feeder device for pulling the plurality of strands and for dispersing them across a moving conveyor belt. This operation produces a continuous glass fiber strand mat. The continuous mat is then needled, wherein the presence of the titanium dioxide permits the use of less penetration of the needles into the mat and the use of smaller diameter needles to give improved flow properties to the mat when combined with thermoplastic polymer to produce a laminate which is then stamped.

The dried sized glass fiber strands are preferably used to reinforce polyolefin polymers including polyethylene and 5-methylpentene polymers. A preferred polyolefinic polymer for utilization with the instant sized glass fiber strand is polypropylene which includes chemically coupleable polypropylene, which is relatively low in cost and gives good strength properties when reinforced with glass fibers. The ratio of polyolefin polymer to glass may be selected in any ratio that gives the desired properties to the finished article. Generally a ratio of about 10 to about 60 percent by weight is suitable. A preferred amount is about 35 to about 45 percent by weight glass in a polypropylene molded article to give a good balance of cost, properties and structural strength.

The following examples further illustrate the present invention.

In the following examples an aqueous treating composition was prepared that had basic components shown in Table I.

TABLE I

Basic Components of Aqueous Treating Composition

| Functional Identification | Chemical Identification | Weight | Parts by Weight Percent |
|---|---|---|---|
| Coupling Agent | Vinyl tris (beta methoxy ethoxysilane | 21.8 kg | 6.0 |
| pH Control | Acetic Acid | | |
| Free Radical Initiator | 2,2' bis (t-butyl peroxyisopropyl benzene | 12.92 kg | 3.4 |
| Non-Ionic Surfactant | Octyl phenoxy polyethoxyethanol | 1.72 kg | .6 |
| Lubricant | Emerylube (Sold by Emery Industries) a cationic active acid solubilized, fatty acid amide | 0.14 kg | .03 |
| Film former | polyvinylacetate (54% solids) | 11.49 kg | 3.0 |
| Water | | 329.61 kg | 86.6 |
| Total weight | | 380.4 kg | |

To the basic aqueous treating composition of Table I there was added different amounts of an aqueous dispersion of titanium dioxide available from Borden Chemical Company under the trade designation Aqua-white 458-21 having 35.8 weight percent solids. The different amounts appear in Table II along with the weight percentage of the titanium dioxide dispersion based on the total aqueous treating composition.

TABLE II

Aqueous Treating Composition of Table I Plus

| Sample No. | Amount of TiO$_2$ Dispersion | Weight Percent by Aqueous Size |
|---|---|---|
| 1 | 2.9 kg | 0.076 |
| 2 | 2.9 kg | 0.076 |
| 3 | 1.45 kg | 0.038 |
| 4 | 1.45 kg | 0.038 |

TABLE II-continued

Aqueous Treating Composition of Table I Plus

| Sample No. | Amount of TiO$_2$ Dispersion | Weight Percent by Aqueous Size |
|---|---|---|
| 5 | 1.45 kg | 0.038 |
| 6 | 0.73 kg | 0.019 |
| 7 | 0.73 kg | 0.019 |
| 8 | 0.73 kg | 0.019 |
| 9 | 0.27 kg | 0.007 |
| 10 | 0.27 kg | 0.007 |

The aqueous treating composition having the titanium dioxide were used to treat glass fibers that were prepared into a continuous glass fiber strand and wound into a forming package. Several forming packages of the one type of glass fiber strand sized with one type of aqueous treating composition were dried and prepared into a continuous glass fiber strand mat which was needled. The various needled mats were then used to prepare a composite article of polypropylene reinforced with the needled glass fiber mat. This article was prepared by bringing together two layers of polyolefin, one as an overleaf and one as an underleaf, to the needled mat and these three layers were laminated together at an elevated temperature and pressure. This composite article was then heated in an infrared oven and placed in a mold of a press with water cooled matched metal dies to stamp and cool the material below its softening point. The composite article had up to 40 weight percent glass fiber content.

Table III presents data on the forming of the continuous glass fiber strands, the production of the mat including the loft and tensile strength of the mat, and physical properties of the stamped composite article.

TABLE III

Data on Forming of Treated Glass Fibers, Mat and Composite Article

| Sample of Treated Strand Table II | FORMING Strand Construction[1] | Binder Solids (%) | LOI | MAT PRODUCTION Tensile (psi × 10$^3$) | Loft | COMPOSITION PRODUCTION Glass Content (%) | Void Content | Flexural Strength (psi)[2] | Flexural Modules psi × 10$^6$ | Stamp Tonage |
|---|---|---|---|---|---|---|---|---|---|---|
| 2 | 12/S | 3.1 | Wet (.2) | 7.6 | 6.2 | 39.9 | 3.9 | 17,700 | .83 | 60 |
| 3 | 12/S | 2.9 | Wet (.23) | 6.7 | 5.8 | 32.7 | 3.3 | 13,000 | .62 | 35 |
| 4 | 4/S | 2.9 | Wet (.20) | 4.4 | 4.4 | 38.0 | 4.3 | 16,000 | .80 | 40 |
| 5a | 4/S | 2.4 | Dry (.24) | 7.8 | 4.3 | 33.9 | 3.3 | 16,200 | .80 | 45 |
| 5b | 4/S | 2.4 | Wet (.24) | 3.8 | 3.3 | 43.5 | 3.3 | 19,300 | 1.00 | 70+ |
| 6 | 4/S | 3.4 | Dry (.20) | 8.5 | 4.3 | 38.7 | 3.1 | 17,700 | .79 | 65 |
| 7 | 4/S | 5.0 | Dry (.50) | 8.5 | 4.3 | 37.7 | 3.5 | 17,400 | .79 | 45 |
| 8 | 4/S | 3.6 | Dry (.30) | 9.2 | 5.8 | 42.2 | 4.8 | — | — | 45 |
| 9 | 4/S | 3.6 | Dry (.40) | 9.9 | 6.5 | 40.8 | 3.4 | — | — | 50 |
| 10a | 4/S | 3.4 | (.40) | 12.5 | 5.2 | 40.2 | 3.8 | 17,500 | .76 | 60 |
| 10b | 4/S | 4.9 | (.45) | 14.1 | 4.5 | 41 | 3.2 | 19,300 | .84 | 90+ |
| Basic Size | | | | | | 39.7 | 4.3 | 19,800 | .72 | 55 |
| No TiO$_2$ | 4/S | — | — | 16 | 6.2 avg. of 3 | | | | | |

[1]Strand is directed to the strand construction wherein the number before the diagonal reveals the number of basic strands in the yarns and the S after the diagonal indicates the split in forming the stands from the files.
[2]Flexural strength is in pounds per square inch and flexural modules is in pounds per square inch × 10$^6$.

Table III shows the benefit of the use of titanium dioxide in the aqueous treating composition for treating glass fibers used to produce a mat for reinforcing thermoplastic materials. The combined parameters of tensile and loft for the glass fiber strand mat and stamped tonage for the mat reinforced thermoplastic polymer show the benefit of using the titanium dioxide in the aqueous treating composition of the glass fiber strands. The titanium dioxide treated strands give a mat that has lower tensile and lower loft with similar or higher stamping tonage of the mat reinforced polymer. As a comparison the glass fiber strands treated with an aqueous treating composition of example I without titanium dioxide gives a mat that has higher tensile and loft values. The lower values of tensile and loft indicate a more flowable glass mat.

The foregoing has disclosed an aqueous treating composition for glass fibers, the treated glass fibers and mat and articles made from the treated glass fibers wherein the aqueous treating composition has an effective amount of a water dispersible, solid particulate inorganic compound. The aqueous sizing composition with the inorganic compound present provides glass fiber reinforced thermoplastic articles having imporved stamping properties.

We claim:

1. Aqueous glass fiber treating composition for treating glass fibers that are gathered into strands and prepared into mats for reinforcing thermoplastic polymers, wherein the reinforced polymers have improved stampability, comprising:
   a. an effective amount of lubricant,
   b. an effective amount of solid, particulate, inorganic compound that has a moh hardness equal to or greater than glass and that is dispersible in water as a particulate solid,
   c. one or more coupling agents,
   d. adhesion promoting chemical agent to promote association of the glass fibers with the thermoplastic polymer,
   e. a film-forming polymer, and
   f. water.

2. The aqueous treating composition of claim 1, wherein the adhesion promoting chemical association agent is a free radical initiator.

3. An aqueous treating composition according to claim 2 wherein the free radical initiator is a heat stable organic peroxide.

4. An aqueous treating composition of claim 1 wherein the water dispersible solid particulate inorganic compound is selected from the group consisting of basic carbonate white lead; basic sulfate white lead; basic silicate white lead; leaded zinc oxide; zinc oxide; zinc sulfide; lithopone; titanium dioxide; titanium-calcium composites; antimony oxide; barytes, basic lead carbonate, titanated lithopone titanium dioxide barium sulfate composites; calcium carbonate; calcium sulfate; barium sulfate; silica; aluminum silicates; magnesium silicates; potassium-aluminum silicates; calcium silicates; and sodium-potassium-aluminum silicates.

5. Aqueous treating composition of claim 4 wherein the water dispersible, solid particulate inorganic compound has a particle size ranging from 0.2 to 2 microns.

6. Aqueous treating composition of claim 1 or 4 wherein the water dispersible, solid particulate inorganic compound is present in a water dispersion comprising the inorganic compound, one or more surfactants selected from the group consisting of anionic, nonionic, cationic and amphoteric and water.

7. Aqueous treating composition of claim 1 wherein the coupling agent is an amino coupling agent when a film former is present that is a carboxylated olefinic polymer to provide association between the glass and the thermoplastic polymer which comprises the matrix of the reinforced thermoplastic polymer article.

8. Aqueous treating composition of claim 1 wherein the film former is selected from polyvinyl acetate homopolymer and copolymers.

9. Aqueous treating composition for treating glass fibers that are prepared into mats for reinforcing thermoplastic polymers, wherein the reinforced polymer has improved stampability, comprising:
   a. 0.5 to 10 percent by weight of an inorganic silane coupling agent,
   b. 0.1 to 6.0 percent by weight of an nonionic surfactant,
   c. 0.01 to 1 percent by weight of a glass fiber lubricant,
   d. 0.1 to 6 percent by weight of an inorganic peroxide free radical initiator having a half life exceeding 60 hours at 212° F. and 20 minutes at 300° F.,
   e. about 0.001 to about 1.5 weight percent of an aqueous dispersion having a solid particulate inorganic compound selected from titanium dioxide, basic carbonate white lead, basic sulfate white lead, leaded zinc oxide, zinc sulfide, lithopone, antimony oxide, barytes, basic lead carbonate, titanated lithopone, titanium dioxide barium sulfate composites, calcium carbonate, calcium sulfate, barium sulfate, aluminum silicates, magnesium silicates, potassium-aluminum silicates, calcium silicates and sodium-potassium-aluminum silicates, silica, titanium-calcium composites basic silicate white lead, zinc oxide, and inorganic compounds having a moh hardness at least equal to the moh hardness of glass,
   f. a film-forming polymer, and
   g. the remainder being water.

10. Aqueous treating compositions of claim 9 wherein the film forming polymer present is selected from polyvinyl acetate homopolymers and copolymers.

11. Aqueous composition of claim 9 wherein the aqueous dispersion of the solid particulate inorganic compound includes a nonionic surfactant.

12. Aqueous treating composition of claim 11 wherein the nonionic surfactant is a glycol compound.

13. Aqueous treating composition for treating glass fiber strands that are prepared into mats for reinforcing thermoplastic polymers wherein the reinforced polymer has improved stampability, comprising:
   an amino coupling agent, a stabilizer, a carboxylated polypropylene lubricant, a non-crosslinkable film forming polymer and a self-reactive crosslinking film forming polymer, and an effective amount of a water dispersion of a solid particulate inorganic compound having a moh hardness greater than the moh hardness of glass.

14. Glass fiber strands having the dried residue of the aqueous treating composition of claim 1 or claim 9.

15. Glass fiber strands having the residue of the aqueous treating composition of claim 13.

16. Chopped glass fiber strand mat prepared with the glass fibers of claim 14.

17. Chopped glass fiber strand mat of claim 15.

18. Continuous glass fiber strand mat of claim 14.

19. Continuous glass fiber strand mat of claim 15.

20. Mat of claim 18 which has been needled.

21. Mat of claim 19 which has been needled.

22. Composite article of thermoplastic polymer and mat of claim 20.

23. Composite article of thermoplastic polymer reinforced with mat of claim 21.

24. Composite articles of claim 22 or 23 wherein the thermoplastic polymer is selected from a group consisting of polyolefins, polyamides, and polyalkylene terephthalates.

25. A mat of glass fiber strands for reinforcing thermoplastic polymers, wherein the reinforced thermoplastic polymer has improved stampability, comprising:
   a. continuous, chopped or mixture thereof glass fiber strands substantially uniformly distributed in an approximate horizontal direction,
   b. a dried residue of an aqueous sizing composition intimately contacting a substantial portion of the peripheral surfaces of the glass fibers, where the aqueous sizing composition is comprised of:
      (a) an effective amount of lubricant,
      (b) an effective amount of a, solid, particulate, inorganic compound dispersible in water as a solid particulate and having a moh hardness equal to or greater than glass;
      (c) one or more coupling agents,
      (d) adhesion promoting chemical agent to promote association of the glass fibers with the thermoplastic polymer, and
      (e) water.

26. Method of producing a mat of glass fiber strands for reinforcing thermoplastic polymers, wherein the reinforced thermoplastic polymer has improved stampability, comprising:
   a. forming glass fibers from molten cones of glass at the tips of orifices in a bushing by attenuation;
   b. sizing said glass fibers with an aqueous sizing composition, comprising:
      i. an effective amount of lubricant,
      ii. an effective amount of solid, particulate, inorganic compound that is dispersible in water as a solid particulate and has a moh hardness equal to or greater than glass,
      iii. one or more coupling agents,
      iv. adhesion promoting chemical agent to promote association of the glass fibers with the thermoplastic polymer, and
      v. water;
   c. gathering said fibers into strand,
   d. collecting said glass fiber strand into a package,
   e. removing the strand from a plurality of the packages,
   f. disposing of the plurality of glass fiber strands in a substantially uniform distribution in an approximate horizontal direction to produce the mat of glass fiber strands.

* * * * *

UNITED STATES PATENT AND TRADEMARK OFFICE
CERTIFICATE OF CORRECTION

PATENT NO. : 4,369,264
DATED : January 18, 1983
INVENTOR(S) : John A. Baumann, Raymond H. Cates and Charles E. Picone It is certified that error appears in the above-identified patent and that said Letters Patent are hereby corrected as shown below:

Column 12, Claim 11, line 34, insert the word --treating-- after the word "Aqueous"

Signed and Sealed this

Twenty-ninth Day of March 1983

[SEAL]

Attest:

GERALD J. MOSSINGHOFF

Attesting Officer     Commissioner of Patents and Trademarks